US010337875B2

(12) United States Patent
Hao et al.

(10) Patent No.: US 10,337,875 B2
(45) Date of Patent: Jul. 2, 2019

(54) CONVERTING BETWEEN DATA STRUCTURES TO DETERMINE A SHORTEST PATH BETWEEN TWO GEOGRAPHIC LOCATIONS

(71) Applicant: Verizon Patent and Licensing Inc., Arlington, VA (US)

(72) Inventors: Jianxiu Hao, Acton, MA (US); Zhiying Jin, Lexington, MA (US); Ming Chen, Bedford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 181 days.

(21) Appl. No.: 15/425,752

(22) Filed: Feb. 6, 2017

(65) Prior Publication Data

US 2018/0224294 A1 Aug. 9, 2018

(51) Int. Cl.
*G01C 21/34* (2006.01)
*H04W 4/02* (2018.01)

(52) U.S. Cl.
CPC ........ *G01C 21/3492* (2013.01); *H04W 4/023* (2013.01); *H04W 4/025* (2013.01)

(58) Field of Classification Search
CPC combination set(s) only.
See application file for complete search history.

(56) References Cited

U.S. PATENT DOCUMENTS

| 7,688,227 B1* | 3/2010 | Tosun | G01C 21/367 340/539.2 |
| 2011/0113155 A1* | 5/2011 | Kuznetsov | G01C 21/3446 709/241 |
| 2011/0125583 A1* | 5/2011 | Hao | G01C 21/3492 705/14.64 |

OTHER PUBLICATIONS

MIT Open Courseware "Greedy/dynamic programming algorithms: Shortest paths," 1.204 Computer Algorithims in Systems Energineering, https://ocw.mit.edu/courses/civil-and-environmental-engineering/1-204-computer-algorithms-in-systems-engineering-spring-2010/lecture-notes/MIT1_204S10_lec12.pdf, Mar. 15, 2010, 18 pages.

* cited by examiner

*Primary Examiner* — Thomas G Black
*Assistant Examiner* — Ana D Thomas

(57) ABSTRACT

A device can receive a request to determine a set of navigational directions, and can obtain a set of traffic objects associated with a first map layer. The set of traffic objects can include nodes to identify one or more geographic locations and one or more links to identify one or more geographic areas between the nodes. The device can determine a shortest-path tree by analyzing the set of traffic objects, the shortest-path tree being associated with a static data structure. The device can generate a dynamic data structure that includes the shortest-path tree and a set of additional traffic objects associated with a second map layer. The device can determine a shortest path by analyzing traffic objects associated with the shortest-path tree and the set of additional traffic objects. The device can provide the set of navigational directions to indicate the shortest path.

20 Claims, 7 Drawing Sheets

CONVERTING BETWEEN DATA STRUCTURES TO DETERMINE A SHORTEST PATH BETWEEN TWO GEOGRAPHIC LOCATIONS

BACKGROUND

A data structure is a particular way of organizing data in a computer. A static data structure is fixed in size, and can be accessed quickly due to contiguous memory allocation. A dynamic data structure is not fixed in size, and can add data and remove data quickly (e.g., by using a pointer). In some dynamic data structures, a pointer of a particular node can reference ("point to") an address space of a subsequent node.

DETAILED DESCRIPTION OF PREFERRED EMBODIMENTS

Figure 1A:
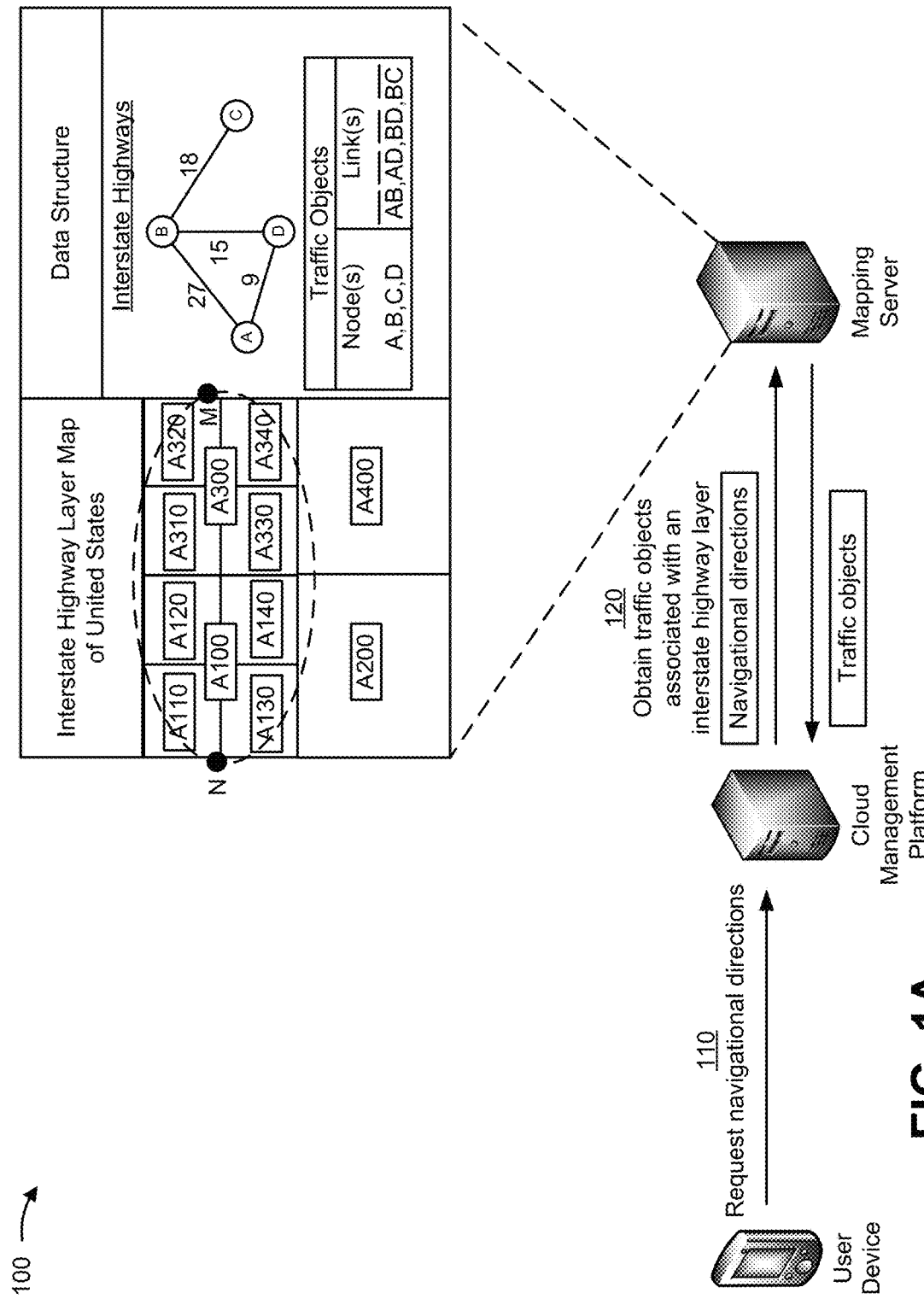
FIGS. 1A-1D are diagrams of an overview of an example implementation described herein.

The following detailed description of example implementations refers to the accompanying drawings. The same reference numbers in different drawings can identify the same or similar elements.

A user device can include a navigation application that displays a map that shows the location of a user of the user device in order to aid the user with navigation. Many navigation applications permit the user to input information, such as a starting point, a destination point, how a path between the starting point and the destination point should be calculated (e.g., using a shortest distance, using a shortest time, etc.), or the like. A navigation application utilizes this information to calculate turn-by-turn instructions for traveling from the starting point to the destination point.

In some cases, mapping information used to determine traveling instructions can be accessed via a static data structure. The static data structure can allow data to be quickly loaded into memory (e.g., using a function such as mmap( )), but can be difficult to modify due to having a fixed size. In other cases, mapping information used to determine the traveling instructions can be accessed via a dynamic data structure. The dynamic data structure can modify data efficiently by storing data in a manner that allows the data to be quickly referenced (e.g., by use of a pointer). However, the dynamic data structure is slow to load data into memory, as nodes have to be loaded one at a time and the data is not stored contiguously.

Implementations described herein allow a cloud management platform to dynamically convert between static data structures and dynamic data structures to provide resource-efficient navigation. For example, the cloud management platform can dynamically convert between data structures to determine a shortest path for a user traveling cross-country. In some cases, the cloud management platform can utilize a static data structure for data points that are less likely to change, and can utilize a dynamic data structure for data points that are more likely to change (e.g., a data point on an interstate highway can be less likely to change than a data point on a local street, as described further herein). By utilizing a static data structure to determine a shortest path for data points that are less likely to change, the cloud management platform conserves processing resources relative to utilizing a dynamic data structure for the entire navigation path. Furthermore, by utilizing a dynamic data structure that includes data points initially included in a static data structure (e.g., data points that are unlikely to change, such as data points associated with an interstate highway) and data points that are not initially included in the static data structure (e.g., data points that are more likely to change, such as data points associated with a local street), the cloud management platform conserves processing resources relative to utilizing a static data structure for the entire navigation path.

FIGS. 1A-1D are diagrams of an overview of an example implementation 100 described herein. For FIGS. 1A-1D, assume a user device communicates with a cloud management platform to obtain navigational directions. Further assume the cloud management platform communicates with a mapping server to obtain traffic objects (e.g., mapping information) for determining the navigational directions.

As shown in FIG. 1A, and by reference number 110, the cloud management platform can receive, from the user device, a request for navigational directions. For example, a user can interact with a user interface associated with the user device to input an initial geographic location and a destination geographic location. As an example, assume that the initial geographic location is an address in San Francisco, Calif., and the destination geographic location is an address in Boston, Mass.

As shown by reference number 120, the request for navigational directions can trigger the cloud management platform to obtain, from the mapping server, a set of traffic objects associated with an interstate highway layer. For example, the mapping server can store a set of traffic objects for a large geographic region (e.g., the United States). In this case, the mapping server can store traffic objects based on different map layers (e.g., a local street layer, an interstate highway layer, etc.), and traffic objects associated with each map layer can be stored using a quad tree data structure. For example, traffic objects associated with the interstate highway layer can be stored using a quad tree data structure that can be separated into four quadrants (shown as A100, A200, A300, and A400), and the four quadrants can be split into sub-quadrants (e.g., A100 can be split into A110, A120, A130, and A140). The quad tree data structure can include a set of traffic objects, which can include nodes that represent intersections of roads, and links that represent portions of road between nodes.

In some implementations, the cloud management platform can use the information included in the request to query the mapping server and obtain a set of traffic objects. For example, the cloud management platform can use, as query search terms, the information indicating the initial geographic location, the information indicating the destination geographic location, information indicating a particular map layer (e.g., the interstate highway layer), or the like, to query the mapping server. In this case, the set of traffic objects can include one or more nodes (e.g., node A, node B, node C, and node D) and one or more links (e.g., link AB, link AD, link BD, and link BC), and the nodes and links can represent possible interstate highways between the initial geographic location and the destination geographic location (e.g., interstate highways between San Francisco, Calif., and Boston, Mass.).

Figure 1B:
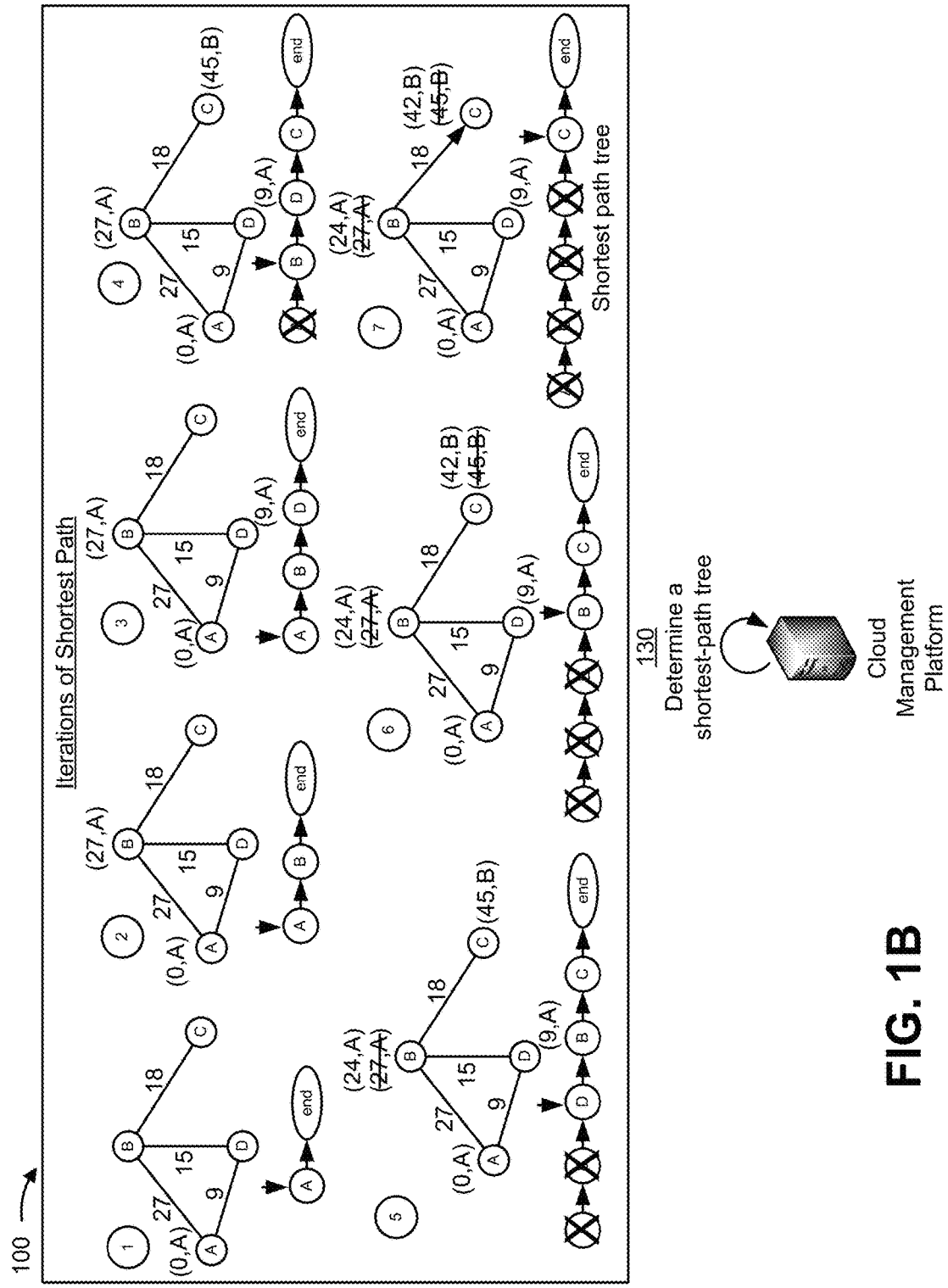

As shown in FIG. 1B, and by reference number 130, the cloud management platform can determine a shortest-path tree. For example, the cloud management platform can apply a shortest path label correcting or label setting technique to the set of traffic objects to determine all (or some) of the possible paths between the initial geographic location and the destination geographic location. In this case, a value shown above a link (e.g., link AB has a value of 27) can indicate a traveling speed or at traveling time (e.g., the value 9 can indicate 27 hours) between the nodes associated with the link (e.g., node A and node B). As shown, the cloud management platform can apply the shortest path technique to determine, in relation to a root node (e.g., node A), the shortest path to each node included in the set of traffic objects. As an example, and as shown by step 1 and step 2 (denoted by circled numbers above and to the left of the networks), the shortest path technique can begin at the root node and can store the distance to the next node (e.g., node B) in the tree (e.g., shown as 27, A). Next, and as shown by step 3, the shortest path technique can iterate to the next node in the free (e.g., node D) and can store the distance from the root node (e.g., shown as 9, A). This process can continue until all (or some) possible paths have been considered, and can provide an output that indicates the shortest path. By using a static data structure to determine a shortest-path tree, the cloud management platform reduces utilization of computing resources relative to generating a dynamic data structure and determining a shortest-path tree with the dynamic data structure.

Figure 1C:
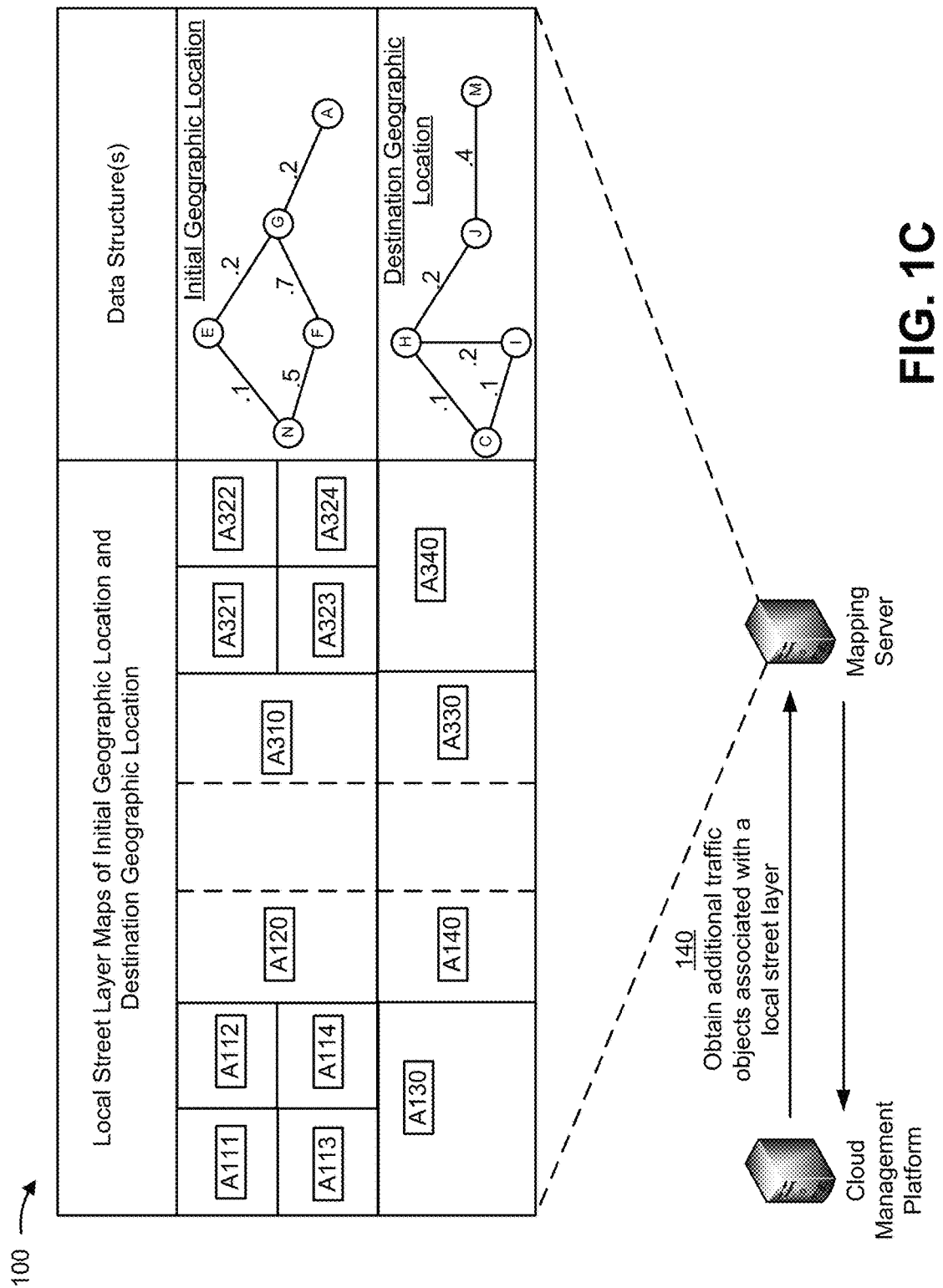

As shown in FIG. 1C, and by reference number 140, the cloud management platform can obtain a set of additional traffic objects associated with a local street layer. For example, the cloud management platform can query the mapping server for a set of additional traffic objects, which can include a first subset of additional traffic objects associated with a geographic area around the initial geographic location (the area shown by A111, A112, A113, and A114), and can include a second subset of additional traffic objects associated with a geographic area around the destination geographic location (the area shown by A321, A322, A323, and A324). In this case, the mapping server can provide, to the cloud management platform, the first subset of additional traffic objects (e.g., node N, node E, node F, node G, node A, link NE, link NF, link EG, link FG, and link GA) and the second subset of additional traffic objects (e.g., node C, node H, node I, node J, node M, link CH, link CI, link IH, link HJ, and link JM).

Figure 1D:
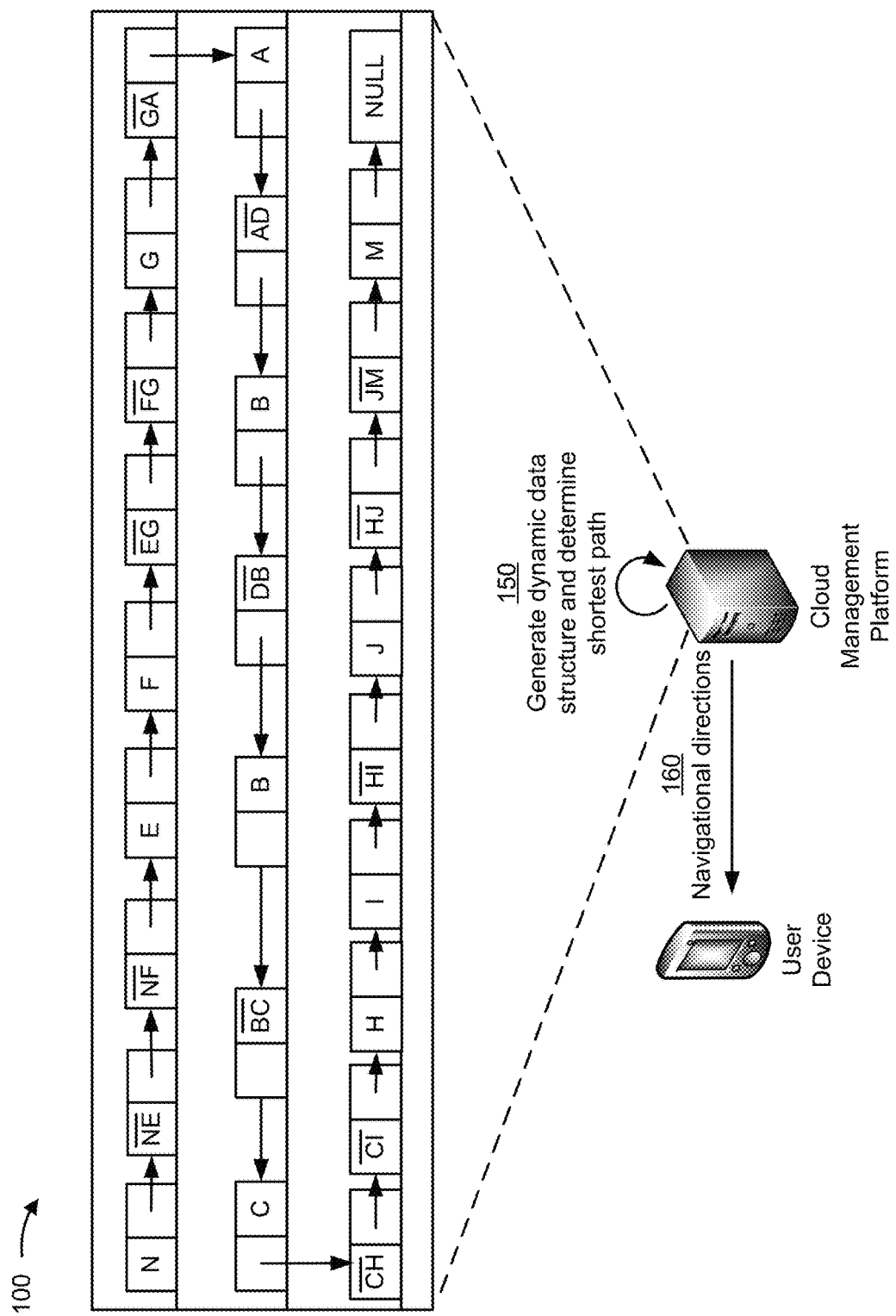

As shown in FIG. 1D, and by reference number 150, the cloud management platform can generate a dynamic data structure and determine a shortest path. For example, the cloud management platform can generate a dynamic data structure, such as a linked-list, using the set of traffic objects associated with the shortest-path tree, the first subset of additional traffic objects associated with the initial geographic location, and the second subset of additional traffic objects associated with the destination geographic location. In this case, the cloud management platform can generate the linked-list by adding the first subset of additional traffic objects associated with the initial geographic location (shown as the first row of the linked-list), by adding the set of traffic objects associated with the shortest-path tree (shown as the second row of the linked-list), and by adding the second subset of the additional traffic objects associated with the destination geographic location (shown as the third row of the linked-list). By generating a dynamic data structure that includes information obtained using a static data structure (e.g., a shortest-path tree), the cloud management platform reduces utilization of computing resources relative to generating a dynamic data structure without using information obtained using the static data structure.

Additionally, the cloud management platform can determine the shortest path based on generating the linked-list. For example, the cloud management platform can determine the shortest path by applying a shortest path label correcting or label setting technique to the set of traffic objects and to the set of additional traffic objects associated with the linked-list. In this case, the shortest path technique can determine the shortest path between the initial geographic location and the destination geographic location. As shown by reference number 160, the cloud management platform can provide the navigational directions to the user device, which can indicate the shortest path from the initial geographic location to the destination geographic location.

In some implementations, the cloud management platform can modify the dynamic data structure based on determining that the user device has deviated from the shortest path. In this case, the cloud management platform can obtain, from the mapping server, another set of additional traffic objects associated with a portion of the local map layer to which the user device is located. Additionally, the cloud management platform can add the other set of additional traffic objects to the dynamic data structure, and can determine a revised shortest path by re-applying a shortest path technique to the traffic objects associated with the dynamic data structure. In this case, the cloud management platform can provide, to the user device, an updated set of navigational directions that indicate the revised shortest path.

By converting between static data structures and dynamic data structures, the cloud management platform conserves processing resources and network resources relative to utilizing a static data structure or a dynamic data structure for determining the set of navigational directions.

As indicated above, FIGS. 1A-1D are provided merely as an example. Other examples are possible and can differ from what was described with regard to FIGS. 1A-1D. For example, while implementations described herein convert between data structures to provide a set of navigational directions, other implementations can convert between data structures to provide other tasks, functions, or services, in a number of different fields and/or industries.

Figure 2:
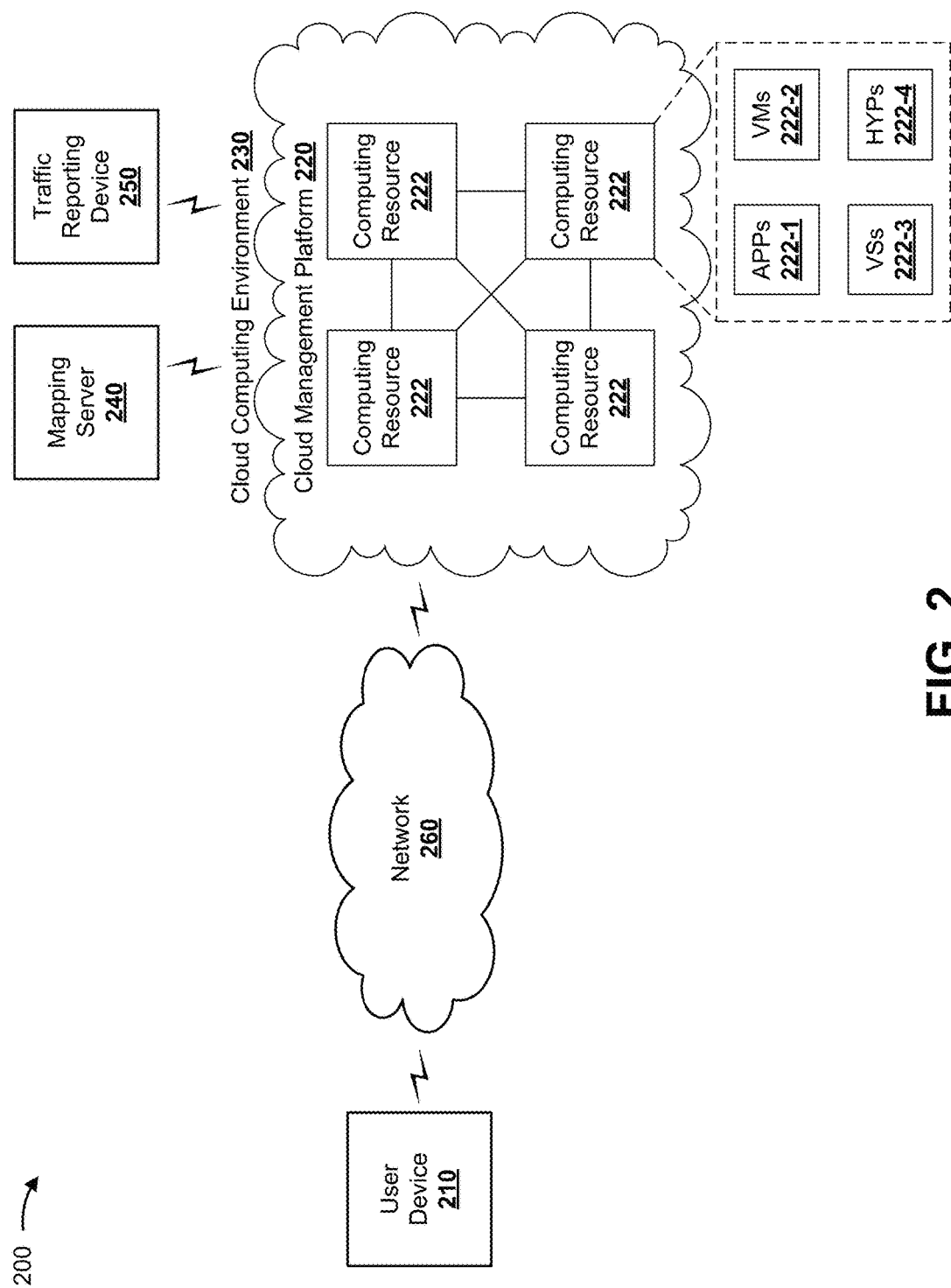
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 210, cloud management platform 220 hosted within cloud computing environment 230, mapping server 240, traffic reporting device 250, and network 260. Devices of environment 200 can interconnect via wired connections, wireless connections, or a combination of wired and wireless connections.

User device 210 includes one or more devices capable of receiving, generating, storing, processing, and/or providing information associated with a navigation application. For example, user device 210 can include a computing device, such as a desktop computer, a laptop computer, a tablet computer, a server device, a mobile phone (e.g., a smart phone or a radiotelephone), a wearable computer (e.g., a smart watch, a smart band, a smart pair of eyeglasses, etc.), a vehicle navigation device, a sensor, or a similar type of device. In some implementations, user device 210 can include a global positioning system (GPS) tracking system and can send GPS measurements to cloud management platform 220.

Cloud management platform 220 includes one or more devices capable of receiving, generating, storing, processing, updating, and/or providing information associated with a navigation application. For example, cloud management platform 220 can include a cloud server or a group of cloud servers.

In some implementations, as shown, cloud management platform 220 can be hosted in cloud computing environment 230. Notably, while implementations described herein describe cloud management platform 220 as being hosted in cloud computing environment 230, in some implementations, cloud management platform 220 might not be cloud-based (i.e., can be implemented outside of a cloud computing environment) or can be partially cloud-based.

Cloud computing environment 230 includes an environment that hosts cloud management platform 220. Cloud computing environment 230 can provide computation, software, data access, storage, and/or other services that do not require end-user knowledge of a physical location and configuration of system(s) and/or device(s) that host cloud management platform 220. As shown, cloud computing environment 230 can include a group of computing resources 222 (referred to collectively as "computing resources 222" and individually as "computing resource 222").

Computing resource 222 includes one or more personal computers, workstation computers, server devices, or another type of computation and/or communication device. In some implementations, computing resource 222 can host cloud management platform 220. The cloud resources can include compute instances executing in computing resource 222, storage devices provided in computing resource 222, data transfer devices provided by computing resource 222, etc. In some implementations, computing resource 222 can communicate with other computing resources 222 via wired connections, wireless connections, or a combination of wired and wireless connections.

As further shown in FIG. 2, computing resource 222 includes a group of cloud resources, such as one or more applications ("APPs") 222-1, one or more virtual machines ("VMs") 222-2, virtualized storage ("VSs") 222-3, one or more hypervisors ("HYPs") 222-4, or the like.

Application 222-1 includes one or more software applications that can be provided to or accessed by user device 210. Application 222-1 can eliminate a need to install and execute the software applications on user device 210. For example, application 222-1 can include software associated with cloud management platform 220 and/or any other software capable of being provided via cloud computing environment 230. In some implementations, one application 222-1 can send/receive information to/from one or more other applications 222-1, via virtual machine 222-2.

Virtual machine 222-2 includes a software implementation of a machine (e.g., a computer) that executes programs like a physical machine. Virtual machine 222-2 can be either a system virtual machine or a process virtual machine, depending upon use and degree of correspondence to any real machine by virtual machine 222-2. A system virtual machine can provide a complete system platform that supports execution of a complete operating system ("OS"). A process virtual machine can execute a single program, and can support a single process. In some implementations, virtual machine 222-2 can execute on behalf of a user (e.g., user device 210), and can manage infrastructure of cloud computing environment 230, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 222-4 can provide hardware virtualization techniques that allow multiple operating systems (e.g., "guest operating systems") to execute concurrently on a host computer, such as computing resource 222. Hypervisor 222-4 can present a virtual operating platform to the guest operating systems, and can manage the execution of the guest operating systems. Multiple instances of a variety of operating systems can share virtualized hardware resources.

Mapping server 240 includes one or more devices capable of receiving, storing, processing, and/or providing information associated with a navigation application. For example, mapping server 240 can include a computing device, such as a server, or a group of servers. In some implementations, mapping server 240 can store traffic objects associated with a geographic map of the planet, and can provide the traffic objects to cloud management platform 220. In some implementations, mapping server 240 can be included in cloud management platform 220. In some implementations, mapping server 240 can be included in a data center.

Traffic reporting device 250 includes one or more devices capable of obtaining, storing, and/or providing sensor-related information. For example, traffic reporting device 250 can include a camera (e.g., a visual spectrum imaging camera, an infrared or near infrared imaging camera, a multispectral imaging camera, a hyperspectral imaging camera, a thermal imaging camera, a laser mapping imagery camera, etc.), a speed detecting device (e.g., a radar detector), or the like. In some implementations, traffic reporting device 250 can communicate with cloud management platform 220 to provide information associated with a speed of one or more vehicles on a particular road and/or an amount of traffic associated with the particular road.

Network 260 includes one or more wired and/or wireless networks. For example, network 260 can include a cellular network (e.g., a long-term evolution (LTE) network, a code division multiple access (CDMA) network, a third generation (3G) network, a fourth generation (4G) network, a fifth generation (5G) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
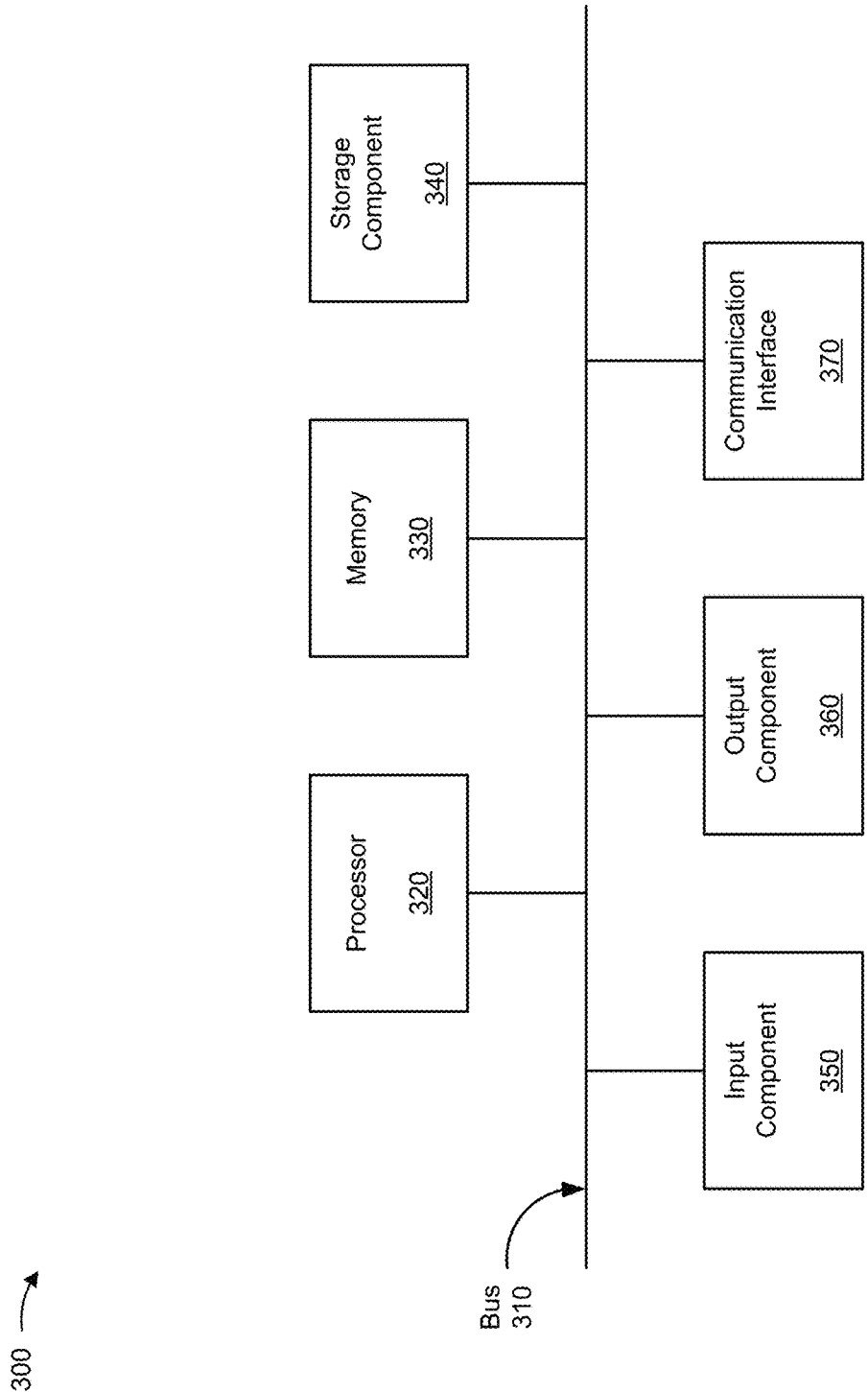
FIG. 3 is a diagram of example components of one or more devices of FIG. 2.

FIG. 3 is a diagram of example components of a device 300. Device 300 can correspond to user device 210, cloud management platform 220, computing resource 222, mapping server 240, and traffic reporting device 250. In some implementations, user device 210, cloud management platform 220, computing resource 222, mapping server 240, and traffic reporting device 250 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a GPS component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
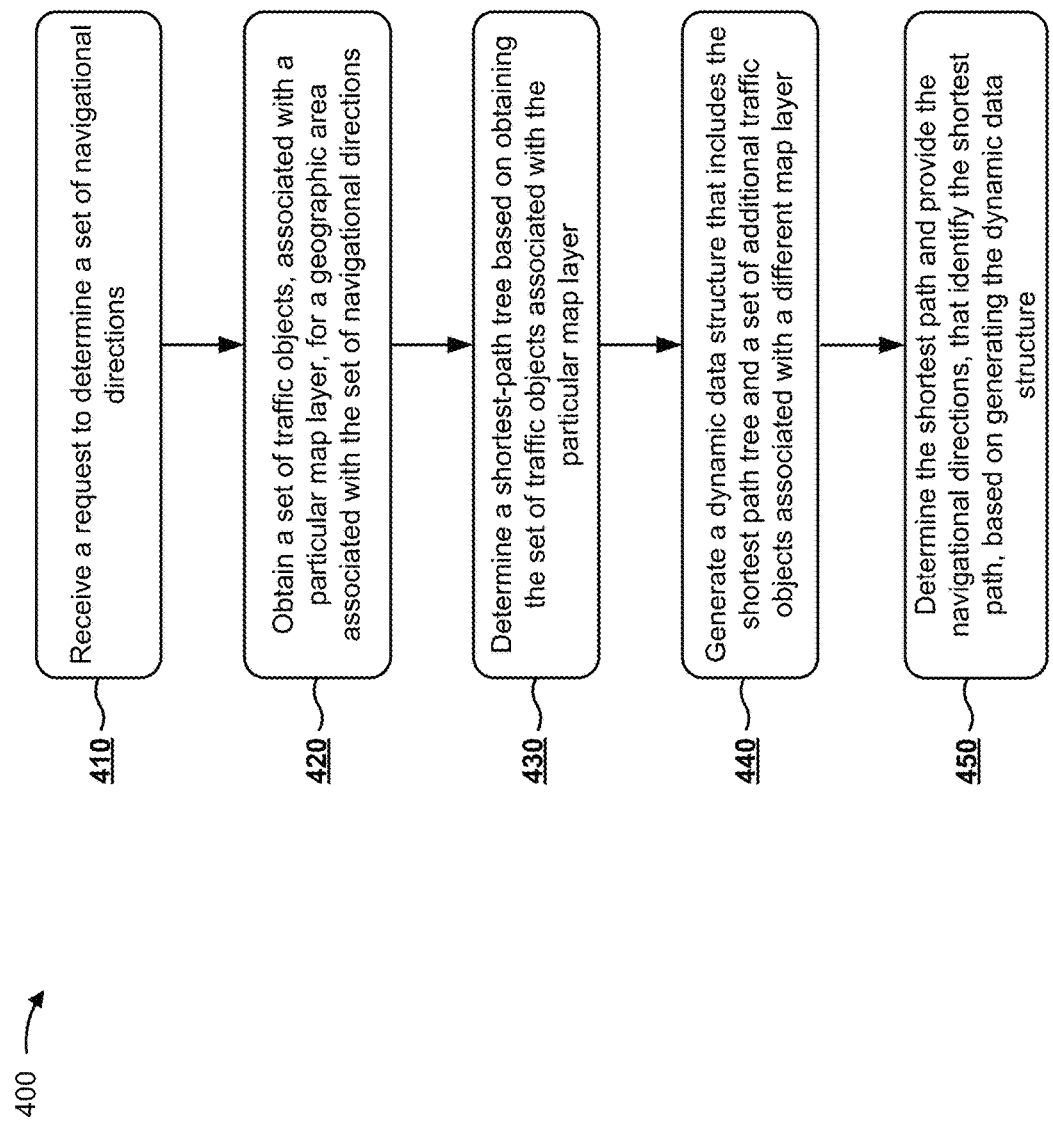
FIG. 4 is a flow chart of an example process for converting between static data structures and dynamic data structures to determine a shortest path between two geographic locations.

FIG. 4 is a flow chart of an example process 400 for converting between static data structures and dynamic data structures to determine a shortest path between two geographic locations. In some implementations, one or more process blocks of FIG. 4 can be performed by cloud management platform 220. In some implementations, one or more process blocks of FIG. 4 can be performed by another device or a group of devices separate from or including cloud management platform 220, such as user device 210, mapping server 240, and traffic reporting device 250.

As shown in FIG. 4, process 400 can include receiving a request to determine a set of navigational directions (block 410). For example, cloud management platform 220 can receive, from user device 210, a request to determine a set of navigational directions. The request can include information identifying an initial geographic location, information identifying a destination geographic location, or the like. In some cases, the information identifying the initial geographic location can indicate a current location of user device 210, and the information identifying the destination geographic location can indicate a geographic location to which a user, using user device 210, is intending to travel.

As further shown in FIG. 4, process 400 can include obtaining a set of traffic objects associated with a particular map layer, for a geographic area associated with the set of navigational directions (block 420). For example, cloud management platform 220 can obtain, from mapping server 240, a set of traffic objects associated with a particular map layer (a first map layer) such as an interstate highway layer. The set of traffic objects can include one or more nodes and one or more links. A node can identify a geographic location, such as an intersection of two roads or a point within a road. A link can identify a geographic area between nodes, such as a portion of a road between two nodes.

In some implementations, mapping server 240 can store map data of a road network. For example, mapping server 240 can store map data associated with a geographic area (e.g., the continental United States), and the map data can include one or more map layers. In some cases, the one or more map layers can include a highway layer, such as an interstate highway layer or a state highway layer, a local street layer, or the like. In other cases, the map layers can include fewer, additional, or different layers. For example, the map layers can include an unclassified road layer (e.g., including information regarding some unpaved roads) and/or a regular street layer (e.g., including information regarding local streets that are not included in the local street layer). A map layer can include information regarding the nodes and the links associated with that map layer.

In some implementations, mapping server 240 can store a map layer with a quad tree data structure. For example, mapping server 240 can partition the map layer into four quadrants using a quad tree data structure. In this case, a root of the quad tree can represent the entire geographic area associated with the map layer, and the four quadrants can represent four geographic areas within the quad tree. The borders can be indicated by geographic coordinates (e.g., a longitudinal coordinate, a latitudinal coordinate, an altitudinal coordinate, etc.). In some cases, a quadrant can be further divided in four additional sub-quadrants. As an example, if a quantity of traffic objects within a quadrant satisfies a threshold (e.g., if a region is extremely populated and has a large quantity of traffic objects), then mapping server 240 can further divide the quadrant into four sub-quadrants. Additionally, the quad tree can facilitate searching for traffic objects, as described further herein.

In some implementations, cloud management platform 220 can obtain a set of traffic objects based on receiving the request to determine the navigational directions. For example, cloud management platform 220 can query mapping server 240 to obtain a set of traffic objects relating to a path for which user device 210 has requested directions. In this case, cloud management platform 220 can use, as query search terms, the initial geographic location, the destination geographic location, the particular map layer (e.g., a local street layer, an interstate highway layer, etc.), or the like, and the query can cause mapping server 240 to send a set of traffic objects to cloud management platform 220.

In some implementations, cloud management platform 220 can obtain a set of traffic objects associated with an interstate highway layer. In some cases, the set of traffic objects associated with the interstate highway layer can include nodes and links for highways between the initial geographic location and the destination geographic location. In some implementations, the traffic objects can include nodes and links within a threshold range of the initial geographic location and the destination geographic location.

As an example, assume that cloud management platform 220 receives a request to travel from an address in San Francisco, Calif., to an address in Boston, Mass. In this case, cloud management platform 220 can request, from mapping server 240, a set of traffic objects for an interstate highway layer between San Francisco, Calif., and Boston, Mass. The request can cause mapping server 240 to provide a set of traffic objects associated with interstate highways between San Francisco, Calif., and Boston, Mass. By obtaining a set of traffic objects for a particular map layer, cloud management platform 220 reduces utilization of computing resources relative to obtaining traffic objects for the entire geographic area (e.g., for multiple map layers, for all map layers, etc.).

In some implementations, cloud management platform 220 can obtain a set of traffic objects for a particular geographic area. For example, cloud management platform 220 can request, to mapping server 240, a set of traffic objects relating to a particular geographic area. In this case, the particular geographic area can be based on the request for navigational directions, and can be large enough to ensure that the set of traffic objects cover all (or some) of the paths between the initial geographic location and the destination geographic location.

As further shown in FIG. 4, process 400 can include determining a shortest-path tree based on obtaining the set of traffic objects associated with the particular map layer (block 430). For example, cloud management platform 220 can determine a shortest-path tree based on determining some, or all, of the possible paths between the initial geographic location and the destination geographic location. In this case, cloud management platform 220 can determine a shortest-path tree by analyzing the set of traffic objects associated with the particular map layer. Additionally, the shortest-path tree can be associated with a static data structure.

In some implementations, cloud management platform 220 can determine a shortest-path tree by applying a shortest path label correcting or label setting technique. For example, cloud management platform 220 can apply a Hao-Kocur technique, a Bellman-Ford technique, a D'Esopo-Pape technique, a Bertsekas technique, or the like, to determine a shortest-path tree. In this case, cloud management platform 220 can use the shortest path technique to analyze the one or more traffic objects to determine all (or some) of the possible paths between the initial geographic location and the destination geographic location. In some cases, the one or more traffic objects can include information indicating a traveling speed (e.g., a designated speed allowed on a particular road, as indicated by a speed limit sign). Additionally, cloud management platform 220 can determine a time it takes user device 210 to travel through a particular road (e.g., referred to as a traveling time) by multiplying the information indicating the traveling speed by the distance associated with the particular road. Cloud management platform 220 can use the information indicating the traveling time when determining the shortest-path tree.

Additionally, or alternatively, cloud management platform 220 can communicate with traffic reporting device 250 to obtain real-time information regarding vehicle speeds (e.g., relative to a GPS reading indicating the location of user device 210), and cloud management platform 220 can use this information when determining the shortest-path tree. For example, cloud management platform 220 can obtain, for the set of traffic objects and/or the set of additional traffic objects, information indicating a real-time traveling speed. In some cases, the set of traffic objects and/or the set of additional traffic objects can represent a geographic area within a threshold distance of user device 210.

Additionally, cloud management platform 220 can replace, for one or more traffic objects in the set of traffic objects and/or one or more traffic objects in the set of additional traffic objects, the information indicating the traveling speed with the information indicating the real-time traveling speed. In this case, the information indicating the real-time traveling speed can provide an indication of traffic congestion within the threshold distance of user device 210. Furthermore, cloud management platform 220 can apply a shortest path technique to determine a shortest-path tree that is based on the information indicating the real-time traveling speed. In this way, cloud management platform 220 improves the accuracy of the shortest path determination, thereby conserving processing resources. For example, cloud management platform 220 conserves processing resources because determining a shortest path, allowing user device 210 to drive until reaching an area of traffic that is experiencing congestion, and re-determining the shortest path when user device 210 reaches the congestion can cost more computing resources and/or network resources than obtaining real-time traveling speed data and using the real-time traveling speed data to make more accurate shortest path determinations.

In some implementations, cloud management platform 220 can determine a shortest-path tree for a set of traffic objects associated with a particular map layer. For example, cloud management platform 220 can apply a shortest path technique to a set of traffic objects associated with an interstate highway layer to determine a shortest-path tree. As an example, assume cloud management platform 220 receives a request for navigational directions, and that the request includes an initial geographic location at an address in San Francisco, Calif., and a destination geographic location at an address in Boston, Mass. Further assume cloud management platform 220 obtains a set of traffic objects associated with an interstate highway layer, and that the one or more traffic objects include information indicating interstate highways between San Francisco, Calif., and Boston, Mass. In this case, cloud management platform 220 can determine a shortest-path tree by determining all (or some) interstate highway paths between San Francisco, Calif., and Boston, Mass.

By using a static data structure to determine a shortest-path tree for a portion of the path that is least likely to change (e.g., a user is less likely to change interstate highways during a long distance route trip than to change paths on shorter local roads), cloud management platform 220 reduces utilization of computing resources relative to using a static data structure for determining the entire set of navigational directions or relative to using a dynamic data structure for determining the entire set of navigational directions.

As further shown in FIG. 4, process 400 can include generating a dynamic data structure that includes the shortest-path tree and a set of additional traffic objects associated with a different map layer (block 440). For example, cloud management platform 220 can request, from mapping server 240, a set of additional traffic objects associated with a different map layer (e.g., a second map layer, that is different than the first map layer), and cloud management platform 220 can generate a dynamic data structure that includes the shortest-path tree and the set of additional traffic objects associated with the different map layer. The dynamic data structure (e.g., a linked-list, a doubly-linked list, a stack, a queue, etc.) can store the one or more traffic objects in a manner that allows traffic objects to be added or removed quickly (e.g., by utilizing a pointer to allow a node to reference an address space of a subsequent node).

In some implementations, cloud management platform 220 can obtain, from mapping server 240, a set of additional traffic objects associated with a different map layer, such as a local street layer. For example, cloud management platform 220 can obtain a set of additional traffic objects for a local street layer that are associated with the initial geographic location and/or the destination geographic location.

In some implementations, cloud management platform 220 can generate a dynamic data structure based on the set of traffic objects associated with the shortest-path tree and the set of additional traffic objects. For example, cloud management platform 220 can generate a dynamic data structure by adding the set of traffic objects and/or the set of additional traffic objects to a dynamic data structure, such as a linked-list. In this case, cloud management platform 220 can add, to the dynamic data structure, a first subset of additional traffic objects that are associated with a geographic area around the initial geographic location or around the geographic location of user device 210, the set of traffic objects associated with the shortest-path tree, and a second subset of the additional traffic objects that are associated with a geographic area around the destination geographic location. In this way, cloud management platform 220 is able to reduce utilization of computing resources by generating a dynamic data structure that includes a static shortest-path tree (e.g. relative to generating a dynamic data structure for the entire set of navigational directions, which can require use of additional computing resources).

In some implementations, cloud management platform 220 can generate a dynamic data structure that includes a first subset of the additional traffic objects associated with the initial geographic location and the set of traffic objects associated with the shortest-path tree. For example, cloud management platform can add, to the dynamic data structure, the first subset of additional traffic objects associated with the initial geographic location, and can add the traffic objects associated with the shortest-path tree. In some cases, such as when user device 210 begins to navigate toward the destination geographic location, cloud management platform 220 can determine that the first subset of additional traffic objects is no longer included in the shortest path. Here, cloud management platform 220 can remove the first subset of additional traffic objects from the dynamic data structure. Additionally, cloud management platform 220 can determine that user device 210 is within a threshold distance of the destination geographic location. In this case, cloud management platform 220 can add, to the dynamic data structure, a second subset of additional traffic objects associated with the destination geographic location.

As further shown in FIG. 4, process 400 can include determining the shortest path and providing the navigational directions that identify the shortest path, based on generating the dynamic data structure (block 450). For example, cloud management platform 220 can determine the shortest path from the initial geographic location to the destination geographic location by analyzing the traffic objects associated with the shortest-path tree and the additional traffic objects associated with the different map layer. In this case, cloud management platform 220 can provide, to user device 210, the set of navigational directions that identify the shortest path.

In some implementations, cloud management platform 220 can determine the shortest path by applying a shortest path label correcting or label setting technique, as described previously herein. For example, cloud management platform 220 can determine the shortest path based on applying a shortest path technique to the first subset of additional traffic objects associated with the initial geographic location, the set of traffic objects associated with the shortest-path tree, and the second subset of additional traffic objects associated with the destination geographic location. In some cases, the set of traffic objects associated with the shortest-path tree can be ordered, while the set of additional traffic objects associated with the initial geographic location and the destination geographic location can be unordered. In this way, cloud management platform 220 utilizes a static data structure and a dynamic data structure in determining the shortest path, thereby conserving processing resources relative to determining the shortest path by relying solely on a static data structure or relying solely on a dynamic data structure.

In some implementations, cloud management platform 220 can provide, to user device 210, the set of navigational directions that identify the shortest path. For example, cloud management platform 220 can provide the shortest path for display on a user interface associated with user device 210. In this way, the set of navigational directions can allow a user, that uses user device 210, to travel from the initial geographic location to the destination geographic location.

In some implementations, cloud management platform 220 can determine that user device 210 has deviated from the shortest path, and can provide an updated set of navigational directions that indicates a revised shortest path. For example, cloud management platform 220 can determine that user device 210 has deviated from the shortest path by receiving GPS data indicating that user device 210 is no longer on the shortest path. In this case, cloud management platform 220 can obtain another set of additional traffic objects associated with the different map layer, where the other set of additional traffic objects is different than the set of additional traffic objects. In some cases, the other set of additional traffic objects can be associated with a geographic area around user device 210. Additionally, cloud management platform 220 can add the other set of additional traffic objects to the dynamic data structure. In this case, cloud management platform 220 can determine a revised shortest path by analyzing the traffic objects associated with the shortest-path tree, the set of additional traffic objects, and/or the other set of additional traffic objects. Furthermore, cloud management platform 220 can provide, to user device 210, an updated set of navigational directions that indicate the revised shortest path. Additionally, or alternatively, cloud management platform 220 can receive information indicating that traffic congestion is present in a geographic location included within the shortest path, and can perform one or more steps stated above to provide user device 210 with a revised shortest path. By determining a revised shortest path by adding additional traffic objects associated with a static data structure, into the dynamic data structure, cloud management platform 220 conserves processing resources relative to relying solely on a dynamic data structure.

Additionally, or alternatively, cloud management platform 220 can determine that a subset of the set of traffic objects and/or a subset of the set of additional traffic objects are no longer included in the shortest path. For example, cloud management platform 220 can receive GPS data indicating that user device 210 is at a particular geographic location, and the particular geographic location can indicate to cloud management platform 220 that user device 210 has completed a portion of the trip. In this case, the subset of the set of traffic objects and/or the subset of the set of additional traffic objects can represent geographic locations that are no longer included in the shortest path (e.g., because user device 210 has passed these particular geographic locations). Here, cloud management platform 220 can remove the subset of the set of traffic objects and/or the subset of the set of additional traffic objects from the dynamic data structure. In some cases, removal of the subset of traffic objects and/or the removal of the subset of additional traffic objects can make a first group of resources available. Additionally, cloud management platform 220 can obtain another set of additional traffic objects associated with the different map layer, and cloud management platform 220 can add the other set of additional traffic objects to the dynamic data structure, using the first group of resources. By removing traffic objects from the dynamic data structure when the traffic objects are no longer needed to determine the shortest path, and adding additional traffic objects to the dynamic data structure that are needed to determine the shortest path, cloud management platform 220 maximizes utilization of storage resources.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

By utilizing a static data structure to determine a shortest path for data points that are less likely to change, cloud management platform 220 conserves processing resources relative to utilizing a dynamic data structure for the entire navigation path. Furthermore, by utilizing a dynamic data structure that includes data points initially included in a static data structure (e.g., data points that are unlikely to change, such as data points associated with an interstate highway) and data points that are not initially included in the static data structure (e.g., data points that are more likely to change, such as data points associated with a local street), cloud management platform 220 conserves processing resources relative to utilizing a static data structure for the entire navigation path.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive, from a user device, a request to determine a set of navigational directions from an initial geographic location to a destination geographic location;
obtain a set of traffic objects, associated with a first map layer, based on receiving the request,
the set of traffic objects including nodes to identify one or more geographic locations and one or more links to identify one or more geographic areas between the nodes,
the set of traffic objects cover one or more paths between the initial geographic location and the destination geographic location;
determine a shortest-path tree by analyzing the set of traffic objects associated with the first map layer,
the shortest-path tree being associated with a static data structure;
generate a dynamic data structure that includes the shortest-path tree and a set of additional traffic objects associated with a second map layer that is different than the first map layer,
the set of additional traffic objects cover a geographic area around the initial geographic location or the destination geographic location, and
the first map layer being associated with roads that span a longer distance than roads associated with the second map layer;
determine a shortest path by analyzing traffic objects associated with the shortest-path tree and the set of additional traffic objects; and
provide, to the user device, the set of navigational directions,
the set of navigational directions indicating the shortest path.

2. The device of claim 1, where the one or more processors are further to:
determine that the user device has deviated from the shortest path;
obtain another set of additional traffic objects associated with the second map layer,
the other set of additional traffic objects being different than the set of additional traffic objects;
add the other set of additional traffic objects to the dynamic data structure;
determine a revised shortest path by analyzing the traffic objects associated with the shortest-path tree, the set of additional traffic objects, and/or the other set of additional traffic objects; and
provide, to the user device, an updated set of navigational directions that indicate the revised shortest path.

3. The device of claim 1, where the first map layer is a highway layer and where the second map layer is a local street layer.

4. The device of claim 1, where the one or more processors, when generating the dynamic data structure, are to:
add, to the dynamic data structure, a first subset of additional traffic objects of the set of additional traffic objects,
the first subset of additional traffic objects being associated with a geographic area around the user device,
add, to the dynamic data structure, the traffic objects associated with the shortest-path tree,
the traffic objects being associated with a different geographic area between a geographic location of the user device and the destination geographic location, and
add, to the dynamic data structure, a second subset of additional traffic objects of the set of additional traffic objects,
the second subset of additional traffic objects being associated with the geographic area around the destination geographic location.

5. The device of claim 4, where the one or more processors, when determining the shortest path, are to:
analyze the first subset of additional traffic objects, the traffic objects associated with the shortest-path tree, and the second subset of additional traffic objects, by applying a shortest path technique, and
determine the shortest path based on applying the shortest path technique.

6. The device of claim 1, where the set of additional traffic objects are to include information indicating a traveling speed; and where the one or more processors, are further to:
obtain, for the set of additional traffic objects, information indicating a real-time traveling speed,
the set of additional traffic objects representing a geographic area within a threshold distance of the user device, and
the information indicating the real-time traveling speed being relative to receiving a global positioning system (GPS) location of the user device; and
replace, for the set of additional traffic objects, the information indicating the traveling speed with the information indicating the real-time traveling speed.

7. The device of claim 1, where the one or more processors are further to:
determine that a subset of the set of traffic objects and/or a subset of the set of additional traffic objects are no longer included in the shortest path; and
remove the subset of the set of traffic objects and/or the subset of the set of additional traffic objects from the dynamic data structure.

8. A non-transitory computer-readable medium storing instructions, the instructions comprising:
one or more instructions that, when executed by one or more processors, cause the one or more processors to:
receive, from a user device, a request to determine a set of navigational directions from an initial geographic location to a destination geographic location;

obtain a set of traffic objects, associated with a first map layer, based on receiving the request,
   the set of traffic objects including nodes to identify one or more geographic locations and one or more links to identify one or more roads between the nodes, and
   the set of traffic objections to cover one or more paths between the initial geographic location and the destination geographic location;
determine a shortest-path tree by analyzing the set of traffic objects associated with the first map layer,
   the shortest-path tree being associated with a static data structure;
generate a dynamic data structure that includes the shortest-path tree and a set of additional traffic objects associated with a second map layer that is different from the first map layer,
   the set of additional traffic objects cover a geographic area around the initial geographic location or the destination geographic location,
   the set of additional traffic objects including at least one of:
      a first subset of additional traffic objects associated with the initial geographic location, or
      a second subset of additional traffic objects associated with the destination geographic location, and
   the first map layer being associated with roads that span a longer distance than roads associated with the second map layer;
determine a shortest path by analyzing traffic objects associated with the shortest-path tree and the set of additional traffic objects; and
provide, to the user device, the set of navigational directions,
   the set of navigational directions corresponding to the shortest path.

9. The non-transitory computer-readable medium of claim 8, where the one or more instructions, when executed by the one or more processors, further cause the one or more processors to:
   receive information indicating that traffic congestion is present in a geographic location included within the shortest path;
   obtain another set of additional traffic objects associated with the different map layer,
      the other set of additional traffic objects being different than the set of additional traffic objects, and
      the other set of additional traffic objects being associated with the geographic location in which traffic congestion is present;
   add the other set of additional traffic objects to the dynamic data structure;
   determine a revised shortest path by analyzing the traffic objects associated with the shortest-path tree, the set of additional traffic objects, and/or the other set of additional traffic objects; and
   provide, to the user device, an updated set of navigational directions that corresponds to the revised shortest path.

10. The non-transitory computer-readable medium of claim 8, where the one or more instructions, that cause the one or more processors to generate the dynamic data structure, cause the one or more processors to:
   add, to the dynamic data structure, the first subset of additional traffic objects associated with the initial geographic location,
   add, to the dynamic data structure, the traffic objects associated with the shortest-path tree,
      the traffic objects being associated with a geographic area between the initial geographic location and the destination geographic location, and
   add, to the dynamic data structure, the second subset of additional traffic objects associated with the destination geographic location.

11. The non-transitory computer-readable medium of claim 8, where the one or more instructions, that cause the one or more processors to determine the shortest path, cause the one or more processors to:
   analyze the first subset of additional traffic objects, the traffic objects associated with the shortest-path tree, and the second subset of additional traffic objects, by applying a shortest path technique, and
   determine the shortest path based on applying the shortest path technique.

12. The non-transitory computer-readable medium of claim 8, where the set of additional traffic objects are to include information indicating a traveling speed; where the one or more instructions, when executed by the one or more processors, further cause the one or more processors to:
   obtain, for the set of traffic objects or the set of additional traffic objects within a threshold distance of the user device, information indicating a real-time traveling speed,
      the information indicating the real-time traveling speed being relative to receiving a global positioning system (GPS) location of the user device; and
   replace, for the set of traffic objects and/or the set of additional traffic objects within the threshold distance of the user device, the information indicating the traveling speed with the information indicating the real-time traveling speed,
      the information indicating the real-time traveling speed to provide an indication of traffic congestion within the threshold distance of the user device.

13. The non-transitory computer-readable medium of claim 8, where the one or more instructions, when executed by the one or more processors, further cause the one or more processors to:
   determine that a portion of the first subset of the set of additional traffic objects, and/or a portion of the second subset of the set of additional traffic objects are no longer included in the shortest path; and
   remove the portion of the first subset of the set of additional traffic objects and/or the portion of the second subset of the set of additional traffic objects from the dynamic data structure.

14. The non-transitory computer-readable medium of claim 8, where the one or more instructions, that cause the one or more processors to generate the dynamic data structure, cause the one or more processors to:
   add, to the dynamic data structure, the first subset of additional traffic objects associated with the initial geographic location, and
   add, to the dynamic data structure, the traffic objects associated with the shortest-path tree,
      the traffic objects being associated with a geographic area between the initial geographic location and the destination geographic location; and
   where the one or more instructions, when executed by the one or more processors, further cause the one or more processors to:
      determine that the first subset of additional traffic objects is no longer included in the shortest path;

remove the first subset of additional traffic objects from the dynamic data structure;
determine that the user device is within a threshold distance of the destination geographic location; and
add, to the dynamic data structure, the second subset of additional traffic objects associated with the destination geographic location.

15. A method, comprising:
receiving, by a device and from a user device, a request to determine a set of navigational directions from an initial geographic location to a destination geographic location;
obtaining, by the device, a set of traffic objects associated with a first map layer based on receiving the request,
the set of traffic objects including nodes to identify one or more geographic locations and one or more links to identify one or more roads between the nodes, and
the set of traffic objects cover one or more paths between the initial geographic location and the destination geographic location;
determining, by the device, a shortest-path tree by analyzing the set of traffic objects associated with the first map layer,
the shortest-path tree being associated with a static data structure;
obtaining, by the device, a set of additional traffic objects associated with a second map layer,
the set of additional traffic objects cover a geographic area around the initial geographic location or the destination geographic location, and
the first map layer being associated with roads that span a longer distance than roads associated with the second map layer;
generating, by the device, a dynamic data structure that includes the shortest-path tree and the set of additional traffic objects associated with the second map layer;
determining, by the device, a shortest path by analyzing the traffic objects associated with the shortest-path tree and the set of additional traffic objects; and
providing, by the device and to the user device, the set of navigational directions,
the set of navigational directions being based on the shortest path.

16. The method of claim 15, further comprising:
determining that the user device has deviated from the shortest path;
obtaining another set of additional traffic objects associated with the second map layer,
the other set of additional traffic objects being different than the set of additional traffic objects, and
the other set of additional traffic objects being associated with a geographic area around the user device;
adding the other set of additional traffic objects to the dynamic data structure;
determining a revised shortest path by analyzing the traffic objects associated with the shortest-path tree, the set of additional traffic objects, and/or the other set of additional traffic objects; and
providing, to the user device, an updated set of navigational directions that is based on the revised shortest path.

17. The method of claim 15, where generating the dynamic data structure comprises:
adding, to the dynamic data structure, a first subset of additional traffic objects of the set of additional traffic objects,
the first subset of additional traffic objects being associated with a geographic area around the user device,
adding, to the dynamic data structure, the traffic objects associated with the shortest-path tree,
the traffic objects being associated with a geographic area between the user device and the destination geographic location, and
adding, to the dynamic data structure, a second subset of additional traffic objects of the set of additional traffic objects,
the second subset of additional traffic objects being associated with a geographic area around the destination geographic location.

18. The method of claim 17, where determining the shortest path comprises:
analyzing the first subset of additional traffic objects, the traffic objects associated with the shortest-path tree, and the second subset of additional traffic objects, by applying a shortest path technique, and
determining the shortest path based on applying the shortest path technique.

19. The method of claim 15, where the set of additional traffic objects are to include information indicating a traveling speed; the method further comprising:
obtaining, for the set of additional traffic objects, information indicating a real-time traveling speed,
the set of additional traffic objects representing a geographic area within a threshold distance of the user device,
the information indicating the real-time traveling speed being based on receiving a global positioning system (GPS) location of the user device; and
replacing, for the set of additional traffic objects, the information indicating the traveling speed with the information indicating the real-time traveling speed,
the information indicating the real-time traveling speed to provide an indication of traffic congestion within the threshold distance of the user device.

20. The method of claim 15, further comprising:
determining that a subset of the set of additional traffic objects are no longer included in the shortest path;
removing the subset of the set of additional traffic objects from the dynamic data structure,
the removal of the subset of the set of additional traffic objects to make available a first group of resources;
obtaining another set of additional traffic objects associated with the second map layer; and
adding the other set of additional traffic objects to the dynamic data structure using the first group of resources.

* * * * *